US011388707B2

(12) United States Patent
Gustafsson et al.

(10) Patent No.: US 11,388,707 B2
(45) Date of Patent: Jul. 12, 2022

(54) OUTER-LOOP CONTROL OF A PHYSICAL DOWNLINK CONTROL CHANNEL, PDCCH, LINK

(71) Applicant: TELEFONAKTIEBOLAGET LM ERICSSON (PUBL), Stockholm (SE)

(72) Inventors: Christer Gustafsson, Huddinge (SE); Anders Ohlsson, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/772,492

(22) PCT Filed: Dec. 21, 2017

(86) PCT No.: PCT/SE2017/051330
§ 371 (c)(1),
(2) Date: Jun. 12, 2020

(87) PCT Pub. No.: WO2019/125256
PCT Pub. Date: Jun. 27, 2019

(65) Prior Publication Data
US 2020/0404630 A1   Dec. 24, 2020

(51) Int. Cl.
*H04W 72/04* (2009.01)
*H04L 1/18* (2006.01)

(52) U.S. Cl.
CPC ......... *H04W 72/042* (2013.01); *H04L 1/1896* (2013.01)

(58) Field of Classification Search
CPC ... H04W 28/04; H04W 72/04; H04W 72/042; H04W 88/08; H04L 5/0007; H04L 1/1896
(Continued)

(56) References Cited

U.S. PATENT DOCUMENTS

| 9,357,420 | B2 * | 5/2016 | Ahn ...................... H04W 24/10 |
| 2008/0109693 | A1 * | 5/2008 | Maas ..................... H04L 1/1829 |
| | | | 714/748 |

(Continued)

FOREIGN PATENT DOCUMENTS

| WO | 2016075517 A1 | 5/2016 |
| WO | 2017116298 A1 | 7/2017 |

OTHER PUBLICATIONS

International Search Report/Written Opinion in related/corresponding PCT Application No. PCT/SE2017/051330 dated Nov. 5, 2018.

*Primary Examiner* — Peter G Solinsky
*Assistant Examiner* — Sanjay K Dewan
(74) *Attorney, Agent, or Firm* — Patent Portfolio Builders PLLC

(57) ABSTRACT

The present disclosure relates to a method for a wireless device configured to perform outer-loop control of a Physical Downlink Control Channel, PDCCH, link. The method comprises obtaining, based on reporting from a UE, actual PDCCH success rate values indicative of the transmission success on a PDCCH for two or more of respective downlink control information, DCI, formats among several DCI formats, obtaining expected PDCCH success probability values indicative of DCI format success probabilities for the two or more DCI formats, obtaining discrepant values for respective of the two or more of said DCI formats by comparing the actual PDCCH success rate values to the expected PDCCH success probability values, determining a PDCCH link outer loop compensation factor by suppressing a higher among the discrepant values, and performing a PDCCH link transmission using the PDCCH link outer loop compensation factor.

14 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2012/0236813 A1* | 9/2012 | Tan | H04L 5/001 |
| | | | 370/329 |
| 2015/0172022 A1* | 6/2015 | Guo | H04L 5/0053 |
| | | | 370/329 |
| 2016/0007374 A1* | 1/2016 | Lee | H04W 72/0446 |
| | | | 370/336 |
| 2016/0173239 A1* | 6/2016 | Kim | H04L 1/1812 |
| | | | 370/329 |
| 2017/0048885 A1* | 2/2017 | Lampinen | H04W 4/70 |

* cited by examiner

OUTER-LOOP CONTROL OF A PHYSICAL DOWNLINK CONTROL CHANNEL, PDCCH, LINK

TECHNICAL FIELD

The present disclosure relates to a method for outer-loop control of a Physical Downlink Control Channel, PDCCH, link in a cellular communications network. Furthermore, the present disclosure also relates to corresponding wireless device, computer programs, computer program products and carriers.

BACKGROUND

3rd Generation Partnership Program (3GPP) Long Term Evolution (LTE) and LTE-Advanced standards are developed to meet growing capacity demands due to rapid expansion wireless data services. One challenging aspect of these standards is the optimal usage of limited radio resources used by multiple wireless devices. Specifically, the physical downlink shared channel (PDSCH) is designed to carry downlink data, and the physical uplink shared channel (PUSCH) is designed to carry uplink data, while the physical downlink control channel (PDCCH) is designed to carry downlink control information (DCI) in each subframe to provide wireless devices with necessary scheduling information in terms of resource allocation, modulation and coding scheme information, and power level information for proper downlink data reception and/or uplink data transmission.

In current LTE standards, there are several DCI formats, including DCI formats 0 and 3 for uplink (UL) and DCI formats 1 and 2 for downlink (DL). A DCI carrying DL scheduling information is also referred to as a DL assignment and a DCI carrying UL scheduling information is also referred to as an UL grant. The information of each DCI may typically be rate matched and scrambled with a cell-specific and slot-specific scrambling sequence. One wireless device could have one or more DCIs in the same subframe. Each DCI is carried on one or more control channel elements (CCEs) depending on DCI length and DL radio channel condition. The number of CCEs used is often called the CCE aggregation level, which can be 1, 2, 4, or 8. An aggregation level larger than 1 means DCI payload is repeated over more than one CCE, resulting in a low code rate, which is often needed for wireless devices in poor radio channel conditions.

PDCCH link adaptation (LA) intends to choose an optimal CCE aggregation level and power for each DCI and for each wireless device based on the DL channel condition of the wireless device. If the channel condition is good, a small number of CCEs (a low CCE aggregation level) and/or a low transmit power may be used. Otherwise, if the channel condition is bad a large number of CCEs and a high transmit power may be required or used. The number of control symbols available to be used for PDCCH is limited. As such, the number of available CCEs for each subframe, which are shared by all the wireless devices serviced by a network node, is also limited. That means the performance of PDCCH Link Adaption, LA, may greatly impact the LTE network performance by affecting factors such as capacity and the number of wireless devices served by a network node.

As an example, in the case of Voice over Internet Protocol (VoIP), a large number of DCIs is required. PDCCH capacity may therefore be a key limiting factor for VoIP capacity.

If PDCCH LA is too aggressive and therefore using a small number of CCEs and/or a low transmit power for each wireless device, wireless devices may have more PDCCH decoding failures. This means that some wireless devices may fail to locate the related DL data sent through the physical downlink shared channel (PDSCH) or may miss UL grants for physical uplink shared channel (PUSCH) transmission. This may result in significant throughput reduction and/or reduced user satisfaction.

On the other hand, if PDCCH LA is too conservative by using a large number of CCEs or a high transmit power for each wireless device, the number of wireless devices that can be accommodated within each subframe will be smaller, which may lead to a low VoIP capacity, which is especially unacceptable in VoIP applications. As such, good PDCCH LA design is important.

The channel condition used in the PDCCH LA for a wireless device is based on the Channel Quality Indicator (CQI), which is determined by the wireless device and reported back to the network node through UL channels such as PUSCH or Physical Uplink Control Channel (PUCCH). The network node will use CQI reports to estimate Signal-to-Interference-plus-Noise ratio (SINR), which, together with a target PDCCH block error rate (BLER), is used to determine PDCCH LA. This is referred to as pure CQI report based PDCCH LA. Accurate and timely CQI reports will help the network node to adjust the CCE aggregation level and transmit power.

CQI reporting suffers from some drawbacks, e.g. limited reporting interval, varying reporting accuracy and not taking into account the interference on PDCCH regions or PDSCH resource blocks.

Thus, there is a strong need for an additional adjustment on the CQI reported from the wireless device. This additional adjustment is referred to as an outer-loop adjustment by setting a compensation value. The outer-loop adjustment done for control signal link adaptation. E.g., the PDCCH LA, may be referred to as control signal outer-loop adjustment. Similarly, there is also an outer-loop adjustment done for the data signal link adaptation, e.g., for the PDSCH LA, and that is referred to as data signal outer-loop adjustment.

The setting of the outer-loop adjustment is typically based on success or failure of the PDCCH link and is part of the outer-loop link adaption, which strives to set a target value of the PDCCH link such that a fair balance between the needs of the data channel on one hand and on the other the need for control channel is made. The success or failure of the PDCCH link is also referred to as success rate of the PDCCH link, and is used to set the adjustment or compensation value. It is the network node that performs the PDCCH link adaption and PDCCH outer loop adjustment. Its understanding of the PDCCH transmission success is based on the UE response to the PDCCH transmission. In an example, when the PDCCH carries a DL assignment, and the UE successfully acquires this DL assignment on the PDCCH, it then tries to decode the data on the PDSCH. If successful the UE transmits a HARQ ACK. If non-successful in decoding the data it transmits a HARQ NACK. If unsuccessful in acquiring the DL assignment no HARQ response is transmitted. In conventional solutions, a failure of any of the DL PDCCH transmission and an UL transmission acknowledging the DL PDCCH transmission would be considered as a PDCCH link failure. This has the drawback of triggering a too conservative PDCCH LA, thus using a large number of CCEs or a high transmit power for each wireless device.

Thus there is a need to provide a solution which mitigates or solves the described drawbacks and problems.

SUMMARY

An objective of embodiments of the invention is to provide a solution which mitigates or solves the drawbacks and problems described above. The above and further objectives are achieved by the subject matter described herein. Further advantageous embodiments or implementation forms of the invention are also defined herein.

According to a first aspect of the invention, the above mentioned and other objectives are achieved with a method for a network node, configured to perform outer-loop control of a Physical Downlink Control Channel, PDCCH, link. The method comprises obtaining, based on a response from a UE, actual PDCCH success rate values indicative of the transmission success on a PDCCH for two or more of respective downlink control information, DCI, formats among several DCI formats, obtaining expected PDCCH success probability values indicative of DCI format success probabilities for the two or more DCI formats, obtaining discrepant values for respective of the two or more of said DCI formats by comparing the actual PDCCH success rate values to the expected PDCCH success probability values, determining a PDCCH link outer loop compensation factor by suppressing a higher among the discrepant values, and performing a PDCCH link transmission using the PDCCH link outer loop compensation factor.

At least an advantage of the invention according to the first aspect is to improve resource usage of a PDCCH link.

According to a second aspect of the invention, the above mentioned and other objectives are achieved with a wireless device configured to operate in a wireless communication system and configured to perform the method according to the first aspect.

The advantages of the second aspect are the same as for the first aspect.

Further applications and advantages of embodiments of the invention will be apparent from the following detailed description.

Figure 1:
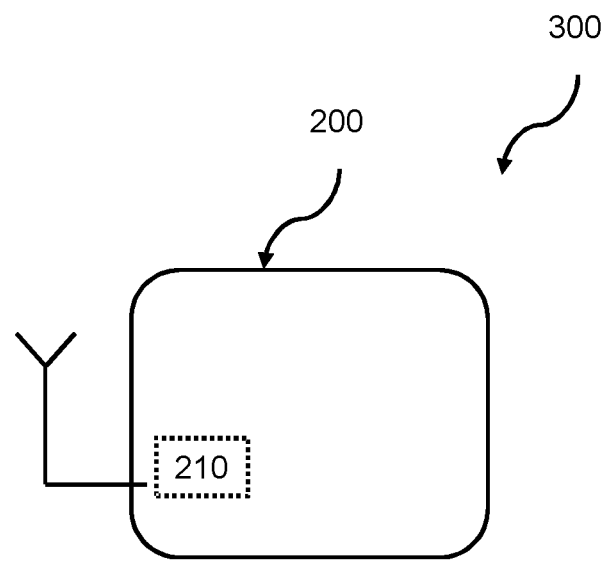
FIG. 1 shows a wireless communication system according to one or more embodiments of the present disclosure.
Figure 1:
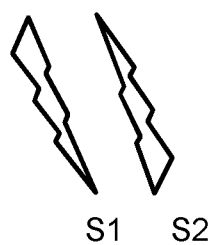
Figure 1:
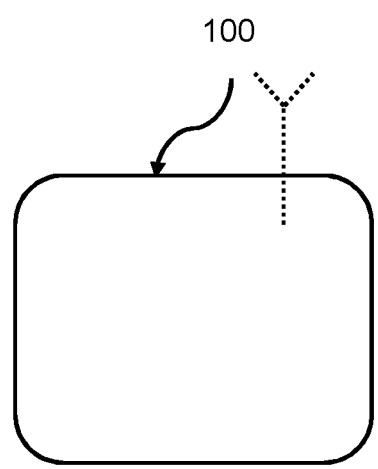

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

PDCCH outer loop link adaptation strives to set a target value for the PDCCH link adaptation that will result in control messages sent on the PDCCH are received at a desired error rate. It is the network node, such as a radio base station, that controls the PDCCH link adaption, and for that purpose need information about the success rate of the PDCCH reception at the user equipment, UE, that receives the specific PDCCH. When the UE responds to control information sent on PDCCH in an expected way the network node determines that the PDCCH transmission was successful, and when the UE does not respond in an expected way the network node determines that the PDCCH transmission was non successful. This may result in that the network node determines that the PDCCH quality to be less than what is the case, as some of the failing responses from the UE may owe to the uplink filing and not to the PDCCH. The inventors of the technology presented here have realized that differences in robustness on different types of control information transmitted on the PDCCH, can be used as indicators of a likelihood that a failing response from a UE results from a failing PDCCH reception. The PDCCH success rates of the different types of messages, as compared to their respective expected success rate can then be used for an improved PDCCH outer-loop adjustment method that is less influenced by errors in the UL.

In some embodiments the non-limiting term user equipment (UE) is used interchangeably with wireless device and refers to any type of wireless device communicating with a network node or with another UE in a cellular, mobile communication system or wireless communication network. Examples of a UE are a target device, a device to device (D2D) UE, a machine type UE or a UE capable of machine to machine (M2M) communication, a PDA, a PAD, a Tablet, a mobile terminal, a smart phone, a laptop embedded equipped (LEE), a laptop mounted equipment (LME), a USB dongle, a ProSe UE, a V2V UE, a V2X UE, a MTC UE, a eMTC UE, a FeMTC UE, a UE Cat 0, a UE Cat M1, a narrow band lot (NB-IoT) UE, a UE Cat NB1, etc.

In some embodiments herein a further term "network node" is used and it can correspond to a wireless communication network node, which communicates with other wireless devices, such as a user equipment, UE, a network node or any other wireless communications network node. Examples of network nodes are Transmission/Reception Point TRP, NodeB, MeNB, SeNB, gNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. The expressions TRP and network node are used interchangeably in the present disclosure.

The embodiments herein are described for LTE based systems such as MTC, eMTC, NB-IoT etc. As an example MTC UE, eMTC UE and NB-IoT UE also called as UE category 0, UE category M1 and UE category NB1. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000, 5G, NR/NX, etc.

The term signal used herein can be a physical signal, such as a control signal transmitted on PDCCH.

The term physical resource may comprise of a time resource and/or a frequency resource. The term time resource used herein may correspond to any type of physical resource or radio resource expressed in terms of length of time. Examples of time resources are: symbol, time slot, sub frame, radio frame, TTI, interleaving time, special sub frame, UpPTS, short TTI (sTTI), short sub frame (SSF) etc. The term a frequency resource used herein may correspond to any type of physical resource or radio resource expressed in terms of frequency bandwidth. Examples of a physical resource are resource block (RB), physical RB (PRB), virtual RB (VRB), resource element (RE) etc.

The term measurement report used herein can signify communication network, e.g. wireless communication network, conditions or quality metrics experienced and measured by the UE or the network node, e.g. Signal-to-noise ratio SNR, Signal-to-interference-plus-noise ratio SINR, ratio of average received signal energy per subcarrier to total received power per subcarrier (Ês/Iot)), RSRQ, received signal quality, received signal strength, Channel Quality Information CQI, Precoding Matrix Indicators PMI, Rank Indicator RI or an SNR value or another kind of partial channel information. The wireless communication network conditions may be measured with regards to its serving cell or received signal quality and/or received signal strength at the serving cell with regards to the UE. The measurement report may be comprised in a signal or wireless signal, as defined above. For example in terms of received signal quality and/or received signal strength at the UE with regards to a target cell, on which it performs one or more radio measurements and sends a corresponding measurement report.

The term "configured to" may be used interchangeably with "adapted to" or "operative to" in the disclosure herein.

The term "memory" may be used interchangeably with "computer readable medium" or "non-transitory computer readable medium" in the disclosure herein.

The term "learning mode" may be used interchangeably with "learning phase" or "training mode" or "training phase" in the disclosure herein.

As mentioned above, PDCCH is a physical channel that carries downlink control information (DCI) and it has at least the following characteristics:
  Mapped to the first L OFDM symbols in every downlink subframe.
  Number of the symbols, L, for PDCCH can be 1, 2, or 3.
  Number, L, of the symbols for PDCCH is specified by PCFICH
  PDCCH carries DCIs and the DCI carries Transport format, scheduling assignments and resource allocation for the downlink shared data channel, DL-SCH, scheduling grants and resource allocation for the uplink shared data channel, UL-SCH, H-ARQ information related to DL-SCH, UL-SCH and PCH.
  PDCCH also carries DCI 0 which is for UL scheduling grants.
  Multiple PDCCH are supported and a UE monitors a set of control channels.
  Modulation Scheme is QPSK.
  PDCCH is like HS-SCCH for HSDPA and PDCCH for R99, E-AGCH/E-RGCH for HSUPA
  Even though PDCCH has a lot of functions, not all of them are used at the same time so PDCCH configuration should be done flexibly.

Detailed information on how mapping is performed in this channel can be found in section 6.8.1 of TS 36.211 3GPP.

A physical control channel is transmitted on an aggregation of one or several consecutive control channel elements (CCEs), where a control channel element may correspond to 9 resource element groups. The number of resource-element groups not assigned to PCFICH or PHICH is REG N. The CCEs available in the system are numbered from 0 and N_CCE-1, where N_CCE=floor (N_REG/9). The PDCCH supports multiple DCI formats. A PDCCH consisting of n consecutive CCEs may only start on a CCE fulfilling 1 mod n=0, where 1 is the CCE number.

There are 4 different aggregation levels on the PDCCH defined in LTE and they are 1, 2, 4 and 8. Which is used with each DCI format and mapped on to the DL control symbols. Basically, all downlink control channels are defined in terms of following terms:
  REG—Resource element group, which is smallest defined unit and includes 4 subcarriers/resource elements
  CCE—Control channel element, which is a group of 9 REGs, that means there are a total of 9×4=36 subcarriers and since all the control channels are mapped using QPSK/BPSK which basically can map 2 bits per subcarrier, we can accommodate 72 control channel bits per CCE In one example, there are 4 different aggregation levels supported in LTE downlink, they are 1, 2, 4 and 8. Each of these numbers basically specify the number of CCE they require to map a PDCCH DCI, as shown below:
  Aggregation level=1
  Number of CCE=1
  Number of subcarriers available to map=36
  Number of bits possible to map=72
  Aggregation level=2
  Number of CCE=2
  Number of subcarriers available to map=72
  Number of bits possible to map=144
  Aggregation level=4
  Number of CCE=4
  Number of subcarriers available to map=144
  Number of bits possible to map=288
  Aggregation level=8
  Number of CCE=8
  Number of subcarriers available to map=288
  Number of bits possible to map=576

Downlink assignments transmitted on the PDCCH indicate if there is a transmission on a DL-SCH for a particular UE and provide the relevant HARQ information.

In order to transmit on the UL-SCH the UE must have a valid uplink grant which it may receive dynamically on the PDCCH, in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

Hybrid Automatic Repeat Request (HARQ) is a mechanism used in LTE to handle retransmission of missing or erroneous transmitted packets. The HARQ procedure consists in providing quick feedbacks (ACK/NACK) to the transmitter for each transport block according to the output of the decoding procedure applied at the receiver (e.g. Cyclic Redundancy Check (CRC)). As an exception to other UL transmissions on the PUSCH, an uplink grant is not required.

In order to increase the probability of successfully decoding of a transport block, HARQ is enforced by the soft combining technique. In LTE, a special soft combining method is used, i.e. the so-called incremental redundancy. Incremental redundancy consists in temporarily storing at the receiver side the erroneously received packet and combining it with the retransmitted replicas of that packet as requested by the HARQ feedback. Such replicas contain the same data as the original transport block but with different encoding thereby puncturing the encoder output in different ways according to a certain scheme of redundancy versions that depend on the specific retransmission attempt.

In legacy LTE, the uplink HARQ feedbacks (ACK/NACK) are conveyed by the Physical Hybrid-ARQ Indicator Channel (PHICH) channel that is transmitted by the eNB upon detection of an uplink transmission on the Physical Uplink Shared Channel (PUSCH) by the UE. On the other hand, the downlink HARQ feedbacks (ACK/NACK) are conveyed by the Physical Uplink Control Channel (PUCCH) that is transmitted by the UE upon detection of a downlink transmission on the Physical Downlink Shared Channel (PDSCH) by the eNB.

The handling of the HARQ timing differs between TDD and FDD technology. In FDD, HARQ feedbacks for a certain transport block are expected to be received 4 subframes after the transmission of a transport block. In TDD, given the different amount of UL/DL occasions within the radio frame, HARQ feedbacks for a certain transport block are supposed to be received at the subframe n+k, where n is the subframe of the corresponding transport block transmission and k>=4 is such that n+k is an uplink or downlink subframe depending on whether a given HARQ feedback has to be transmitted in uplink or downlink respectively.

Given the bursty nature of packet data traffic, it would be desirable that the UE switches off the receiver circuitry at some predefined intervals to limit the battery consumption. In the example of LTE, this behavior is accomplished by the DRX mechanism. When DRX is active, the UE periodically listens for DL control signaling (i.e. grants for UL transmissions or DL scheduling assignment on PDCCH) following a configurable DRX cycle (i.e. short/long DRX cycle) for a certain number of consecutive subframes according to a configurable onDurationTimer. During the rest of the time, the UE sleeps (i.e. at least the receiver circuitry is switched off). The onDurationTimer can be temporarily prolonged by a certain configurable drx-InactivityTimer if a PDCCH is received before the onDurationTimer expires.

It is important to note that regardless of the DRX cycle, if HARQ transmission or retransmissions are still pending when the UE is supposed to sleep, the receiver circuitry remains switched on to listen to DL assignments and similarly in the UL it is switched on at the TTI in which an HARQ feedback from the eNB is expected to be sent on PHICH.

In one example, a PDCCH CFI Mode may be applied. CFI is an indicator telling how many OFDM symbols are used for carrying control channel (e.g, PDCCH and PHICH) at each subframe. The first OFDM symbol/s in a sub-frame is/are used for the control channels and the remaining OFDM symbols of the sub-frame are used for the PDSCH. I.e. The higher the CFI index, the more OFDM symbols used for the control channels and the less are left for used for the PDSCH.

If the CFI is set to 1 for a subframe, it means one symbol (the first symbol) at the subframe is used for PDCCH allocation and if CFI is 2, it means two symbols (the first and the second symbol) are used for PDCCH etc. This CFI is carried by a specific physical channel called PCFICH. PCFICH is only carrying the CFI value, is made up of 31 bits data even though it only represents 4 values. Large CFI value means less space for PDSCH, which means that you would have higher code rate in the subframe with large CFI comparing to the subframe with low CFI value. You would also know that it would get more difficult for the UE to decode PDSCH when Code Rate gets higher.

The PDCCH Link Adaptation, LA, uses the channel estimate in combination with an outer-loop adjustment. The outer-loop adjustment is based on PDCCH link success or failure to set the compensation value. The PDCCH success rate is determined in DL by the reception of HARQ feedback (ACK or NACK) for the data belonging to the DL Assignment on the PDCCH. The PDCCH success rate is determined in UL by detection of the data specified in the UL Grant on the PDCCH.

Some problems or drawbacks of conventional solutions is that the outer-loop of the PDCCH LA adaptation doesn't distinguish between the possible differences of the PDCCH command, such as if it's a DL Assignment or UL Grant and nor which DCI Format that is used. For example, the UL Grants often use DCI Format 0 while DL Assignments may use DCI Format 2A, where the DCI 2A uses more data bits and hence can use less coding bits. If there the network node do not detect there is any UL transmission in the physical resources on the PUSCH that has been granted to the UE by transmission of the DCI format 0 on the PDCCH, while the DL Assignments succeed it's probably not a PDCCH failure, since the UE is able to decode the less protected DCI 2A command. Instead it is likely a PUSCH failure.

However, if from the network node perspective, the PDCCH link is considered to have failed in both scenarios, this may lead to that an excessive amount of CCEs are used for some UEs. This may further lead to delays and drops due to resource shortage or resource lacking on the PDCCH.

The present disclosure solves this by using the different types PDCCH commands, e.g. Assignment, Grant and DCI Format, as an indication of the likelihood that the PUSCH is the reason of the failed PDCCH transmission.

In an example of a method or procedure according to the present disclosure, the following steps are performed:

1. Classify the different "types of PDCCH commands" according to their individual degree of robustness, i.e. DCI format robustness. Success for "types" with lower success probability should have a higher weight for successes while "types" with higher success probability should have a higher weight for failures. In other words, the success of PDCCH commands using DCI formats having a low level of protection and the failure of PDCCH commands using DCI formats having a high level of protection are given particular attention when determining the outer loop compensation factor.

2. Use a sliding window to calculate the success rate of the different types.

3. Make an outer-loop adjustment decision based on above calculations.

The proposed method may also be expressed as an algorithm for comparison, where SP(X): Success Probability for DC Type X, SR(X): Success Rate for DC Type X, N(X): Number of occurrences, Limit-N: lowest number of occurrences for statistical significance.

```
sort "DC Types" based on SP lowest to highest {X1, X2, . . .,Xn}
j=0
for i:=1 to n-1-j
{A=X(i+j)
  B=X(i+j+1)
  if N(i+j) > Limit-N
    if (SP(i+j) < SP(i+j+1)) AND (SR(i+j) > SR(i+j+1))
    EXCLUDE SR(i+j+1)
  fi
  j++}
calculate SR based on non-excluded SR(X)
```

In other words, if a DCI format Type, DCI format Type A, of lower success probability has a higher success rate then a DCI format Type, DCI format Type B, with a higher success probability then the success rate of DCI format Type B should be excluded or less weighted in the outer loop adjustment calculation as the failure may depend on another link. For example, UL Grant failures are caused by PUCCH/PUSCH problems.

FIG. 1 shows a wireless communication system 300 according to one or more embodiments of the present disclosure. The wireless communication system 300 comprises wireless devices, e.g. in the form of a UE 100 and a network nodes, in FIG. 1 just one network node 200 is depicted for simplicity. The network node 200 may be implemented as geographically separate units or as a single integrated unit. In one example, the wireless device 100 may be a UE, the network node 200 may be a base station, eNodeB a server for connection with a radio interface or other control unit comprising a processor and memory. The first wireless device 100 comprises a communications interface 101, e.g. a transceiver 104, and is configured to configured to transmit or receive wireless signals S1/S2. The network node 200 comprises a communications interface 201, e.g. a transceiver, and is configured to configured to transmit or receive wireless signals S1/S2, e.g. to transmit or receive on the same or different bandwidths. The network node 200 may further comprise a plurality of transceivers, also grouped together and referred to as cells herein, which transceivers may be configured to transmit or receive on the same or different bandwidths.

The network node 200 may be configured and/or operative to transmit/receive wireless signals S1/S2 to/from the wireless device 100, e.g. within the total set of radio resources or the transmission BW of the network node 200. The wireless device 100 or the network node 200 may use any suitable radio access technology RAT, as defined above.

Figure 2:
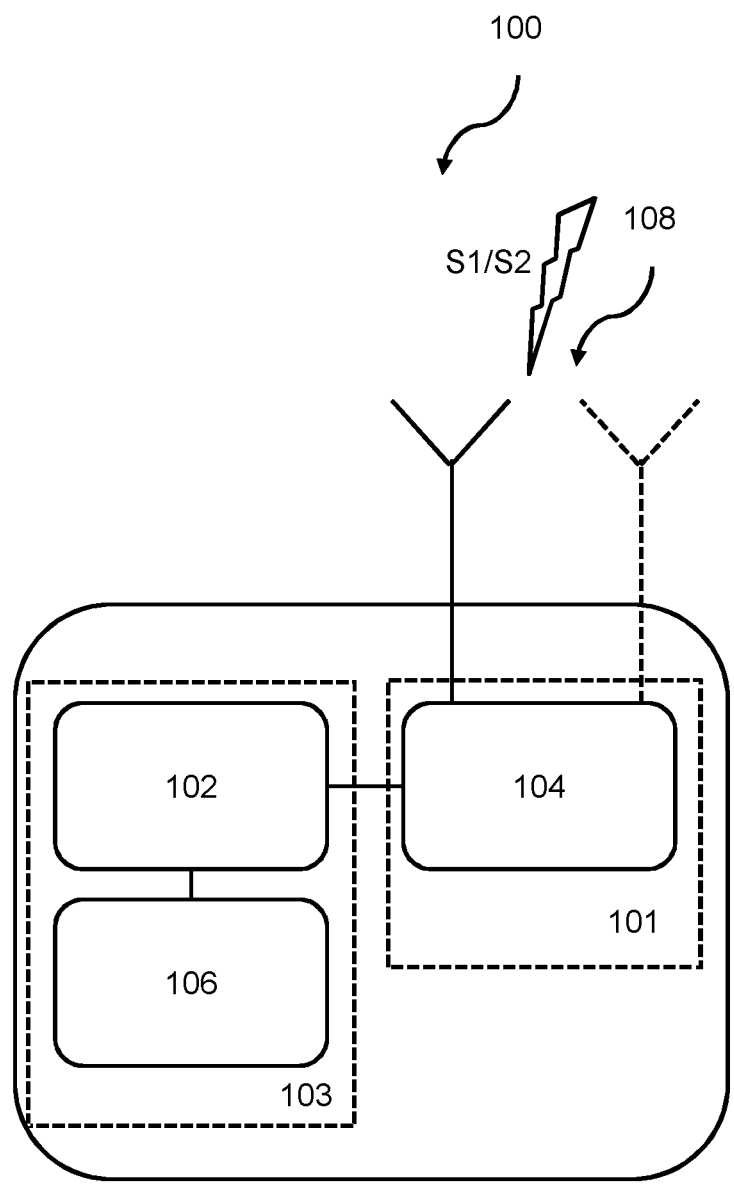
FIG. 2 shows a network node configured for communication or to operate in a wireless communication system according to one or more embodiments of the present disclosure.

FIG. 2 shows a network node 200 configured for communication or to operate in a wireless communication system 300 according to one or more embodiments of the present disclosure. The network node 200 comprises processing circuitry 103. The processing circuitry 103 may comprise a processor 102, and a memory 106, said memory 106 containing instructions executable by said processor, whereby said first network node 200 is operative to perform the method of any of the embodiments described herein. The processor 102 is communicatively coupled to a communications interface 101, e.g. comprising one or more transceivers 104. The communications interface 101 is operative to receive information, such as control information or data information, from the processor 102 and generate a wireless signal S1/S2 for a wireless communication system or to receive the wireless signal S1/S2 for a wireless communication system, demodulate and/or decode the wireless signal S1/S2 to information and send to the processor 102. Further, the network node 200 further comprises one or more antennas 108, as shown in FIG. 2, or alternatively has one or more ports for connection with corresponding antennas. When the antenna/s 108 is/are coupled to the transceiver/s 104 and is/are configured to transmit/emit or receive wireless signals S1/S2 for a wireless communication with the one or mode wireless devices 100, e.g. transmit control information or data information included in the wireless signals S. The processor and/or a processor unit 102 may be, e.g. processing circuitry and/or a central processing unit and/or processor modules and/or multiple processors configured to cooperate with each-other. The memory 106 may comprise of any suitable memory, such as a ROM (Read-Only Memory), a PROM (Programmable Read-Only Memory), an EPROM (Erasable PROM), a Flash memory, an EEPROM (Electrically Erasable PROM), or a hard disk drive. The processor 102 may be communicatively coupled to any or all of the transceiver 104 and the memory 106.

Figure 3:
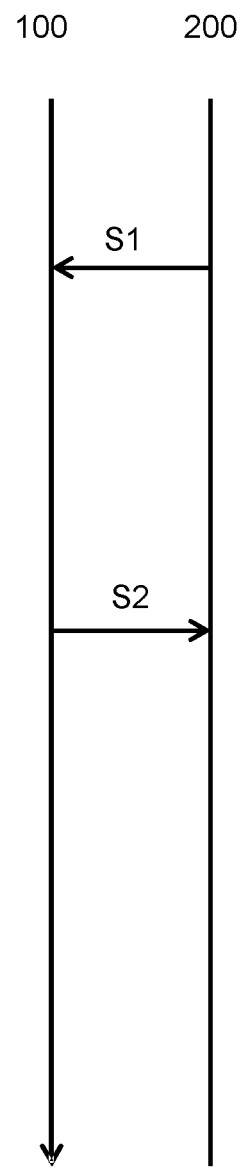
FIG. 3 shows wireless signals exchanged between a wireless device and a network node according to one or more embodiments of the present disclosure.

FIG. 3 shows wireless signals exchanged between two wireless devices according to one or more embodiments of the present disclosure, between a wireless device in form of the UE 100 and a network node 200. The network node 200 may send a first wireless signal S1 to the UE 100, on the PDCCH and the signal comprising control information and being transmitted typically using a particular CCE aggregation level and transmit power. The first wireless signal S1 may further comprise a scheduling grant for UL transmission on the PDSCH.

The particular CCE aggregation level and transmit power is typically selected or determined by the network node based on a channel estimate of a channel or PDCCH link between the UE 100 and the network node 200 and an outer loop compensation factor. In other words, a PDCCH link transmission is performed using the PDCCH link outer loop compensation factor.

In one example, the first wireless signal S1 comprises a DL assignment. Depending on if the first wireless signal S1 successfully received, e.g. passing a CRC check after decoding the first wireless signal. HARQ feedback information is generated which comprises an acknowledgment, ACK, if the PDCCH link transmission was successfully received or a negative acknowledgment, NACK, if the PDCCH link transmission was not successfully received.

The UE then sends a second wireless signal S2 as a response to the network node 200. In other words, an uplink control signal, e.g. a PUCCH link transmission, comprising the HARQ feedback information is transmitted to the network node 200.

In a further example, the first wireless signal S1 comprises an uplink grant. The UE then sends a second wireless signal S2 to the network node 200. The second wireless signal S2 comprises data information and may be transmitted on the PUSCH. In other words, an uplink control signal, e.g. a PUSCH link transmission, comprising the data information is transmitted to the network node 200.

In one example, the downlink HARQ feedbacks (ACK/NACK) are conveyed by the Physical Uplink Control Channel (PUCCH) that is transmitted by the UE upon detection of a downlink transmission on the Physical Downlink Shared Channel (PDSCH) by the network node. As can be seen from FIG. 3, a successful PDCCH link transmission can only be confirmed after the UE has successfully received the PDCCH, the UE has generated HARQ feedback information indicative of an ACK or NACK and the network node 200 has successfully received the second wireless signal S2.

A failed PDCCH link transmission can only be confirmed or detected by the network node 200 when it does not receive an expected response in the form of the second wireless signal S2 from the UE. Though lack of the expected response S2 from the UE typically owes to the UE failing in acquiring the control signal in the downlink, it may alternatively owe to the network node fails to detect the response S2 from the UE. However, in the latter situation adapting the outer loop compensation factor and effectively increasing the particular CCE aggregation level and/or transmit power used to transmit the first wireless signal S1 will not improve the success rate of the PDCCH link. Instead, an excess of CCEs resources may limit the capacity for other PDSCH channels sent to other UEs.

Figure 4:
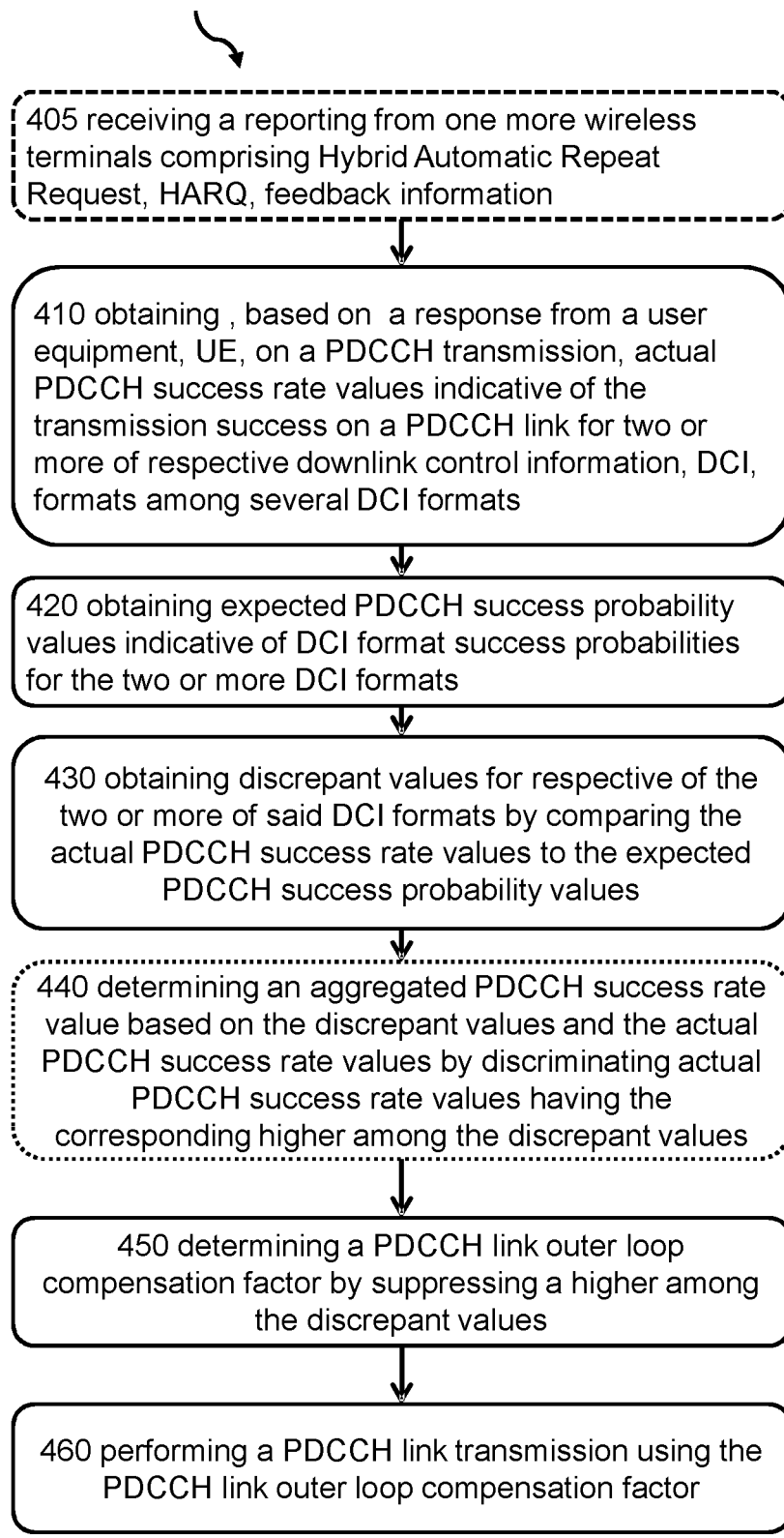
FIG. 4 shows a flowchart of a network node, configured to perform outer-loop control of a control channel, such as a Physical Downlink Control Channel, PDCCH, link according to one or more embodiments of the present disclosure.

FIG. 4 shows a flowchart of a wireless device 100, 200 configured to perform outer-loop control of a control channel, such as a Physical Downlink Control Channel, PDCCH, link according to one or more embodiments of the present disclosure. The method comprising:

OPTIONAL STEP 405: receiving a response S2 from a UE, e.g. comprising Hybrid Automatic Repeat Request, HARQ, feedback information.

STEP 410: obtaining actual PDCCH success rate values indicative of the transmission success on a PDCCH link for two or more of respective downlink control information, DCI, formats among several DCI formats. The actual PDCCH success rate values are based on the response rates from the UE on a different types of control messages by PDCCH transmissions.

In an embodiment, the actual PDCCH success rate values are determined based on the HARQ feedback messages.

In one example, the actual PDCCH success rate values are calculated by dividing a count or total number of HARQ feedback information transmissions successfully received, e.g. ACK or NACK, with the total amount of PDCCH link transmissions sent or total amount of PDCCH commands, such as UL grant or DL assignment commands.

STEP 420: obtaining expected PDCCH success probability values indicative of DCI format success probabilities for the two or more DCI formats.

In one embodiment, the expected PDCCH success probability values are obtained by selecting from predetermined information, by receiving information from another network node—from any other communication system node by retrieving information from a memory 106. Possibly the information has first been collected by compiling statistics from communication with many wireless devices. The predetermined information comprising the PDCCH success probability values may e.g. be determined by performing simulations of the PDCCH link.

STEP 430: obtaining discrepant values for respective of the two or more of said DCI formats by comparing the actual PDCCH success rate values to the expected PDCCH success probability values.

In one embodiment, the discrepant values are calculated by determining a difference between the actual PDCCH success rate values and the corresponding expected PDCCH success probability values.

In one example, a first PDCCH link transmission, comprising an UL Grant, is using a DCI Format 0. A second PDCCH link transmission, comprising a DL assignment, is using DCI Format 2A, where the DCI Format 0 comprises more protection or redundancy than the DCI Format DCI 2A. In other words the DCI Format 0 has a higher expected PDCCH success probability value than the DCI Format 2A. If the discrepant value for DCI Format 0 is higher than the discrepant value for the DCI Format 2A, i.e. the UL Grant fail while the DL Assignments succeed, it is probably not due to a downlink PDCCH failure, since the UE is able to decode the less protected DCI Format DCI 2A. It may then be detected that the uplink transmission, e.g. PUSCH transmission, is the reason of the failed PDCCH link.

OPTIONAL STEP 440: determining an aggregated PDCCH success rate value based on the discrepant values and the actual PDCCH success rate values by suppressing actual PDCCH success rate values having the corresponding higher among the discrepant values.

In a further example, using the same definitions in the example in relation to STEP 430, an aggregated PDCCH success rate value is determined. The actual PDCCH success rate value of the first PDCCH link transmission using a DCI Format 0 may be discriminated or excluded and only the actual PDCCH success rate value of the second PDCCH link transmission using DCI Format 2A is included.

In an embodiment, the actual PDCCH success rate values may be scaled by a weight determined in proportion to the corresponding discrepant values and be used to calculate a aggregated PDCCH success rate value as a weighted sum using the actual PDCCH success rate values and the weights. In an example, the weights are in the range [0 to 1].

STEP 450: determining a PDCCH link outer loop compensation factor by suppressing a higher among the discrepant values.

In one example, actual PDCCH success rate values with corresponding higher among the discrepant values are excluded and not used when determining the PDCCH link outer loop compensation factor.

In an embodiment, the PDCCH link outer loop compensation factor is determined by using the aggregated PDCCH success rate value.

STEP 460: performing a PDCCH link transmission using the PDCCH link outer loop compensation factor.

In one example, this may comprise transmitting a PDCCH command, such as an UL grant or DL assignment command as a first wireless signal S1.

The accuracy of the actual PDCCH success rate values can be improved by considering multiple subsequent transmissions of a particular DCI Format, e.g. by calculating an average. In an embodiment, the actual PDCCH success rate values are determined by calculating a weighted average over subsequent PDCCH link transmissions.

In an embodiment, the actual PDCCH success rate values are determined by calculating a ratio of acknowledgments, ACK, and negative acknowledgments, NACK, comprised in the HARQ feedback information and/or a corresponding total number of PDCCH link transmissions.

In an embodiment, calculating the weighted average over subsequent PDCCH link transmissions comprises weighing the HARQ feedback information in proportion to a feedback information arrival time, wherein recent HARQ feedback information is weighted higher than older HARQ feedback information.

In an embodiment, the weighted average further comprise uplink grant data detection success information, wherein the actual PDCCH success rate values are further based on the uplink grant data detection success information.

Figure 5:
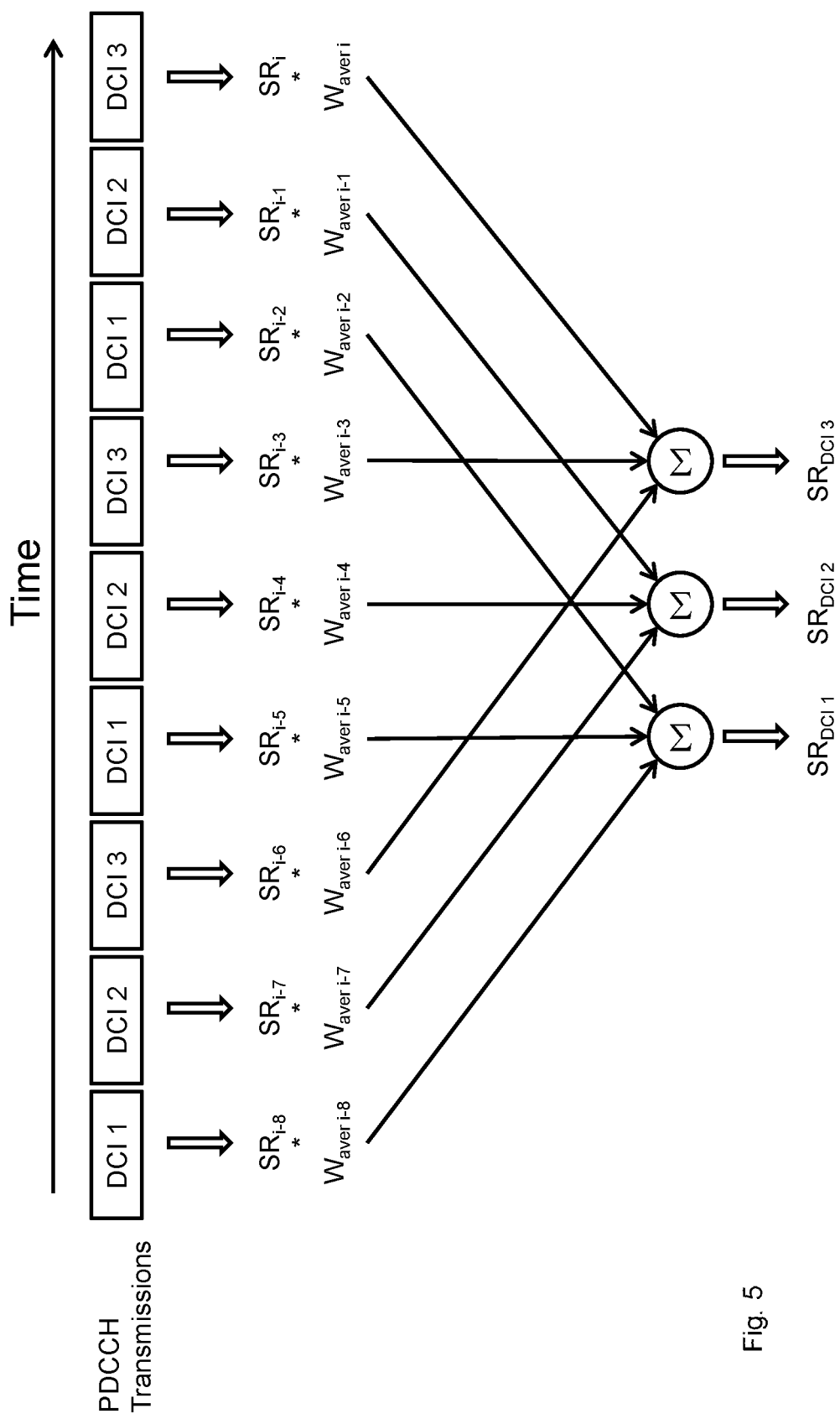
FIG. 5 shows an example of how actual PDCCH success rate values may be determined by calculating a weighted average over subsequent PDCCH link transmissions according to one or more embodiments of the present disclosure.

FIG. 5 shows an example of how actual PDCCH success rate values, $SR_{DCI1}$, $SR_{DCI2}$, $SR_{DCI2}$ may be determined by calculating a weighted average over subsequent PDCCH link transmissions according to one or more embodiments of the present disclosure.

In FIG. 5, subsequent PDCCH link transmissions using different DCI formats DCI1-DCI3 are received over time by the UE. Instant actual PDCCH success rate values $SR_i\text{-}8\text{-}SR_j$ indicative of the transmission success of each of the subsequent PDCCH link transmissions may be determined or calculated. Averaging weights $w_{aver\ i-8}$-$W_{aver\ i}$ are applied to each of the Instant actual PDCCH success rate values $SR_i$-8-$SR_i$, and actual PDCCH success rate values $SR_{DCI1}$, $SR_{DCI2}$, $SR_{DCI2}$ are determined by calculating a weighted average.

In one embodiment, the weights $w_{aver\ i-8}$-$W_{aver\ i}$ weigh the HARQ feedback information in proportion to a feedback information arrival time, wherein recent HARQ feedback information (success/failure) is weighted higher than older HARQ feedback information. I.e. the success of first DCI1 transmission would be less significant than the success of the third DCI1 transmission.

Figure 6:
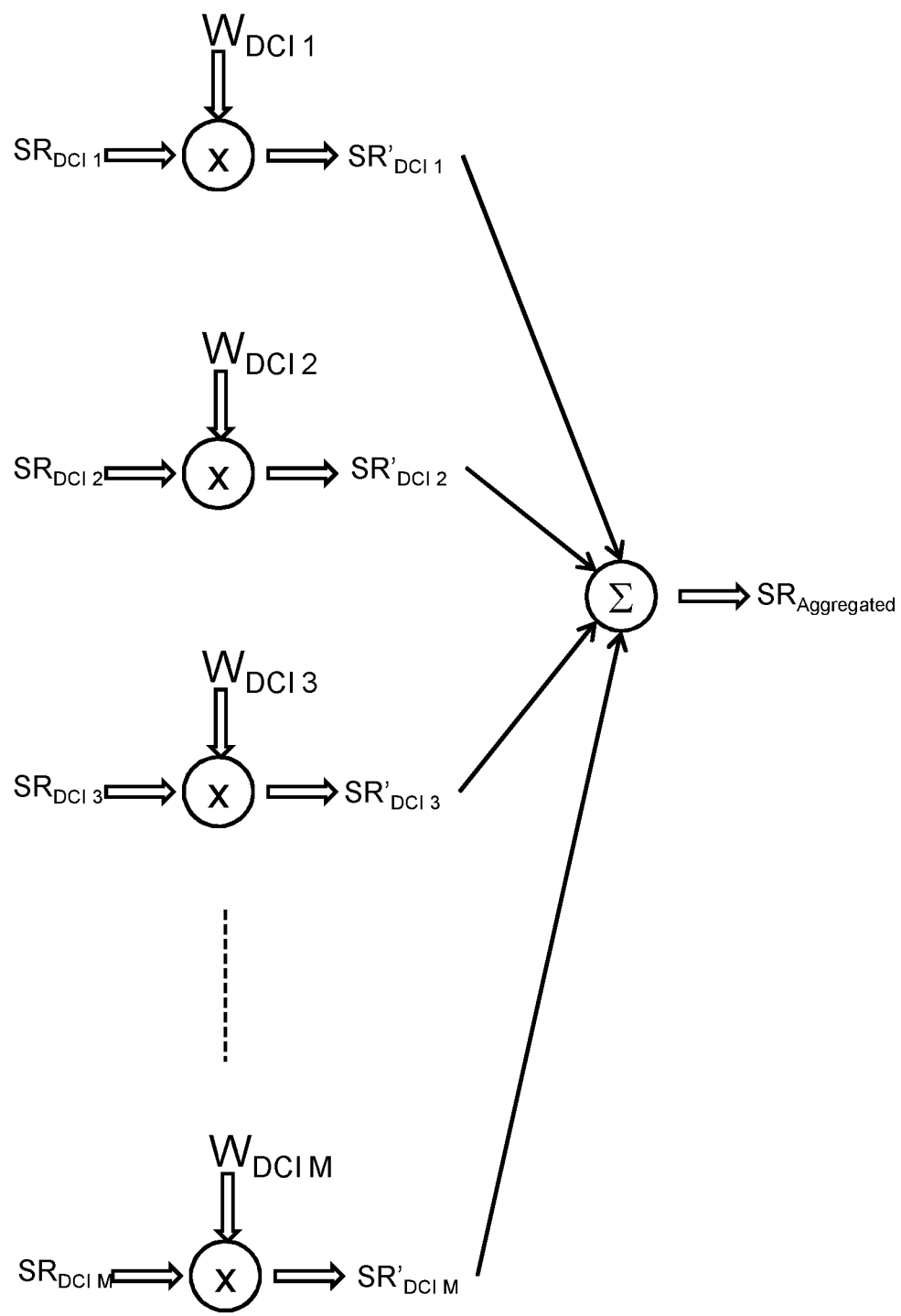
FIG. 6 shows an example of how an aggregated PDCCH success rate value may be determined according to one or more embodiments of the present disclosure.

FIG. 6 shows an example of how an aggregated PDCCH success rate value may be determined according to one or more embodiments of the present disclosure. The actual PDCCH success rate values $SR_{DCI1}$-$SR_{DCIM}$ described in relation to FIG. 5 may be discriminated if they have a corresponding higher among the discrepant values. In other words, actual PDCCH success rate values $SR_{DCI1}$-$SR_{DCIM}$ having corresponding discrepant values that indicates that the actual PDCCH success rate values $SR_{DCI1}$, $SR_{DCI2}$, $SR_{DCI2}$ deviates from expected PDCCH success probability values in a manner typical for uplink, e.g. PUCCH transmission failure will be given a low weight $W_{DCI\ 1}$-$W_{DCI\ M}$. The weighted PDCCH success rate values $SR'_{DCI1}$-$SR'_{DCIM}$ h will then be added together or summed to form an aggregated PDCCH success rate.

In a further aspect of the invention, a network node, 200, is configured to perform outer-loop control of a Physical Downlink Control Channel, PDCCH, link, is provided. The device network node, 200, comprising:

a communication interface 104 and processing circuitry 102 configured to cause the network node, 200, perform any of the method presented here with reference to FIG. 4

In an embodiment, a computer program is provided and comprising computer-executable instructions for causing a network node, when the computer-executable instructions are executed on circuitry, a processor or a processing unit comprised in the network node, to perform any of the method steps described herein. The computer program is included in a computer readable medium of a computer program product. The computer readable medium may comprise of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

In an embodiment, a computer program product comprising a computer-readable storage medium, the computer-readable storage medium having the computer program described above embodied therein.

Furthermore, any methods according to embodiments of the disclosure may be implemented in a computer program, having code means, which when run by processing means causes the processing means to execute the steps of the method.

Moreover, it is realized by the skilled person that the network node 200 and may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

The processor 102, e.g. of the network nod, 200, comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

The invention claimed is:

1. A method for a network node configured to perform outer-loop control of a Physical Downlink Control Channel, PDCCH, link, the method comprising:
    obtaining actual PDCCH success rate values indicative of the transmission success on a PDCCH for two or more of respective downlink control information, DCI, formats among several DCI formats,
    obtaining expected PDCCH success probability values indicative of DCI format success probabilities for the two or more DCI formats,
    obtaining discrepant values for respective of the two or more of said DCI formats by comparing the actual PDCCH success rate values to the expected PDCCH success probability values,
    determining a PDCCH link outer loop compensation factor by suppressing a higher among the discrepant values, and
    performing a PDCCH link transmission using the PDCCH link outer loop compensation factor.

2. The method according to claim 1, further comprising determining an aggregated PDCCH success rate value based on the discrepant values and the actual PDCCH success rate values by suppressing actual PDCCH success rate values having the corresponding higher among the discrepant values, wherein the PDCCH link outer loop compensation factor is determined by using the aggregated PDCCH success rate value.

3. The method according to claim 1, wherein the actual PDCCH success rate values are determined by calculating a weighted average over subsequent PDCCH link transmissions.

4. The method according to claim 3, wherein calculating the weighted average over subsequent PDCCH link transmissions comprises weighing the HARQ feedback information in proportion to a feedback information arrival time, wherein recent HARQ feedback information is weighted higher than older HARQ feedback information.

5. The method according to claim 3, wherein the weighted average further comprise uplink grant data detection success information, wherein the actual PDCCH success rate values are further based on the uplink grant data detection success information.

6. The method according to claim 1, wherein the discrepant values are calculated by determining a difference between the actual PDCCH success rate values and the corresponding expected PDCCH success probability values.

7. The method according to claim 1, wherein the obtaining actual PDCCH success rate values is based on responses being received from a user equipment, UE, on PDCCH transmissions.

8. The method according to claim 7, wherein the response comprises Hybrid Automatic Repeat Request, HARQ, feedback information, wherein the actual PDCCH success rate values are determined based on the HARQ feedback messages.

9. The method according to claim 8, wherein obtaining the actual PDCCH success rate values is further based on calculating a ratio of acknowledgments, ACK, and negative acknowledgments, NACK, comprised in the HARQ feedback information.

10. The method according to claim 7, wherein obtaining the actual PDCCH success rate values is further based on data on a physical uplink shared channel, PUSCH, as received from the UE in response to one or more scheduling grants transmitted on the PDCCH.

11. The method according claim 1, wherein the expected PDCCH success probability values are obtained by selecting from predetermined information, by receiving information from another wireless device or any other communication system node or by retrieving information from a memory.

12. A method for a wireless device configured to perform outer-loop control of a Physical Downlink Control Channel, PDCCH, link, the method comprising:
 receiving a PDCCH link transmission transmitted using a PDCCH link outer loop compensation factor, wherein the compensation factor was determined by suppressing a higher among discrepant values, and
 generating HARQ feedback information comprising an acknowledgment, ACK, if the PDCCH link transmission was successfully received or a negative acknowledgment, NACK, if the PDCCH link transmission was not successfully received, performing a PUCCH transmission comprising the HARQ feedback information.

13. A network node configured to perform outer-loop control of a Physical Downlink Control Channel, PDCCH, link, comprising:
 a communication interface and
 processing circuitry configured to cause the network node to perform a method including:
  obtaining actual PDCCH success rate values indicative of the transmission success on a PDCCH for two or more of respective downlink control information, DCI, formats among several DCI formats,
  obtaining expected PDCCH success probability values indicative of DCI format success probabilities for the two or more DCI formats,
  obtaining discrepant values for respective of the two or more of said DCI formats by comparing the actual PDCCH success rate values to the expected PDCCH success probability values,
  determining a PDCCH link outer loop compensation factor by suppressing a higher among the discrepant values, and
  performing a PDCCH link transmission using the PDCCH link outer loop compensation factor.

14. A non-transitory computer computer-readable storage medium storing computer-executable instructions for causing a network node, when the computer-executable instructions are executed on a processing unit comprised in the network node, to perform a method for outer-loop control of a Physical Downlink Control Channel, PDCCH, link, the method including:
 obtaining actual PDCCH success rate values indicative of the transmission success on a PDCCH for two or more of respective downlink control information, DCI, formats among several DCI formats,
 obtaining expected PDCCH success probability values indicative of DCI format success probabilities for the two or more DCI formats,
 obtaining discrepant values for respective of the two or more of said DCI formats by comparing the actual PDCCH success rate values to the expected PDCCH success probability values,
 determining a PDCCH link outer loop compensation factor by suppressing a higher among the discrepant values, and
 performing a PDCCH link transmission using the PDCCH link outer loop compensation factor-any of the method steps according to claim 1.

* * * * *